(12) United States Patent
Kimura et al.

(10) Patent No.: US 10,633,512 B2
(45) Date of Patent: Apr. 28, 2020

(54) SHEET ADHESIVE AND ADHESION PROCESS USING THE SAME

(71) Applicant: THREE BOND CO., LTD., Hachioji-shi, Tokyo (JP)

(72) Inventors: Hiroshi Kimura, Hachioji (JP); Yoshihide Arai, Hachioji (JP)

(73) Assignee: THREE BOND CO., LTD., Tokyo (JP)

( * ) Notice: Subject to any disclaimer, the term of this patent is extended or adjusted under 35 U.S.C. 154(b) by 69 days.

(21) Appl. No.: 15/603,860

(22) Filed: May 24, 2017

(65) Prior Publication Data
US 2017/0349789 A1    Dec. 7, 2017

(30) Foreign Application Priority Data

Jun. 1, 2016    (JP) .................. 2016-109684

(51) Int. Cl.
| | | |
|---|---|---|
| *C09J 163/00* | (2006.01) | |
| *C08K 5/13* | (2006.01) | |
| *C09J 5/04* | (2006.01) | |
| *C09J 7/25* | (2018.01) | |
| *C09J 175/06* | (2006.01) | |
| *C08K 5/17* | (2006.01) | |
| *C09J 175/04* | (2006.01) | |

(52) U.S. Cl.
CPC .................. *C08K 5/13* (2013.01); *C08K 5/17* (2013.01); *C09J 5/04* (2013.01); *C09J 7/25* (2018.01); *C09J 163/00* (2013.01); *C09J 175/04* (2013.01); *C09J 175/06* (2013.01); *C09J 2201/61* (2013.01); *C09J 2463/006* (2013.01); *C09J 2475/006* (2013.01)

(58) Field of Classification Search
None
See application file for complete search history.

(56) References Cited

U.S. PATENT DOCUMENTS

| | | | | |
|---|---|---|---|---|
| 3,795,807 A | * | 3/1974 | Johnson ............. | G01N 35/1095 250/343 |
| 4,201,808 A | * | 5/1980 | Cully .................. | C09D 183/06 428/40.7 |
| 6,099,900 A | * | 8/2000 | Minamizaki ............... | C09J 7/50 427/208.8 |
| 6,426,138 B1 | | 7/2002 | Narushima et al. | |
| 2011/0174723 A1 | * | 7/2011 | Kawaguchi ............ | B01D 69/02 210/490 |
| 2012/0121878 A1 | * | 5/2012 | Bilcai ..................... | C08L 63/00 428/220 |

FOREIGN PATENT DOCUMENTS

JP    A-2000-68295    3/2000

OTHER PUBLICATIONS

Keiko Ohtsuka, "Synthesis and Properties of Urethane Elastomer-Modified Epoxy Resin having Hydroxymethyl Group", 1994, Polymer Internatonal, vol. 33, pp. 93-102. (Year: 1994).*
Compound summary "Tributylamine", PubChem, U.S. National Library of Medicine, retrieved on Jan. 1, 2019. (Year: 2019).*

* cited by examiner

*Primary Examiner* — Anish P Desai
(74) *Attorney, Agent, or Firm* — Dickinson Wright PLLC

(57) ABSTRACT

It has conventionally been difficult to achieve a sheet adhesive which adheres in a low temperature (from 20 to 90° C.), and has both of softness and high adhering strength. The present invention realizes a sheet adhesive capable of adhering in a low temperature (from 20 to 90° C.) which exhibits a high adhesiveness in spite of being a soft sheet of thin film, by forming a simulated multiple layer by using an elastomer as a substrate layer, and by forming a reactive layer by means of spraying or application.

A sheet adhesive including a substrate layer and a reactive layer, wherein the substrate layer includes a component (A) and a component (B) below, and the reactive layer is formed with a liquid agent including a component (C) below in an amount of from 0.01% by mass to 45% by mass, component (A): a urethane elastomer,
component (B): an epoxy resin,
component (C): an amine compound and/or phenol compound.

8 Claims, 1 Drawing Sheet

SHEET ADHESIVE AND ADHESION PROCESS USING THE SAME

BACKGROUND

Technical Field

The present invention relates to a sheet adhesive especially a sheet adhesive having a curing property, and an adhesion process using the same.

Description of Related Arts

Conventionally known are inventions of multiple layers. For example, JP 2000-68295 A (corresponding to U.S. Pat. No. 6,426,138 B1) discloses an invention of a film (also referred to as "sheet") formed by laminating a layer of a reactive resin or the like that has been brought into a semi-cured state (a state in a halfway of a reaction, also referred to as "B stage") on a substrate layer of a soft material such as rubber and elastomer in a form of a sheet. The invention is characterized in that the sheet is soft and has a close-adhesiveness to an adherend. However, since the sheets are bonded to one another to make a multiple layer, after each of the sheets is formed, the invention include multiple steps; and for being a multiple layer, the sheet as a whole becomes thick to limit the use thereof. In addition, if the reactive layer is a single layer, reaction proceeds with the passage of time to develop higher polymerization, causing a lowered adhesive strength. Moreover, at the time of entering the B stage or at the time of adhesion, a heating at a temperature of 100° C. or more is required, and thus, an adherend can be heated and damaged.

CITATION LIST

Patent Literature

Patent Literature 1: Japanese Patent Application Laid-Open No. 2000-68295

SUMMARY

As described above, it has conventionally been difficult to achieve a sheet adhesive which adheres in a low temperature (from 20 to 90° C.), and at the same time has both of softness and high adhering strength. In a case of using a conventional adhesive, due to a heating or a press-bonding at the time of bonding, fluidity is generated in a substrate layer, causing a change in original dimension. Thus, there has been a need for an improvement in squeeze-out characteristic.

As a result of extensive research to achieve the object, the present inventors have found a method relating to the sheet adhesive, and have accomplished the present invention.

Hereinafter, gist of the present invention will be described.

The first aspect of the present invention is a sheet adhesive which includes a substrate layer including a component (A) and a component (B) below, and a reactive layer formed with a liquid agent including 45% by mass or less of a component (C);

component (A): a urethane elastomer,
component (B): an epoxy resin,
component (C): an amine compound and/or phenol compound.

DETAILED DESCRIPTION

Figure 1:
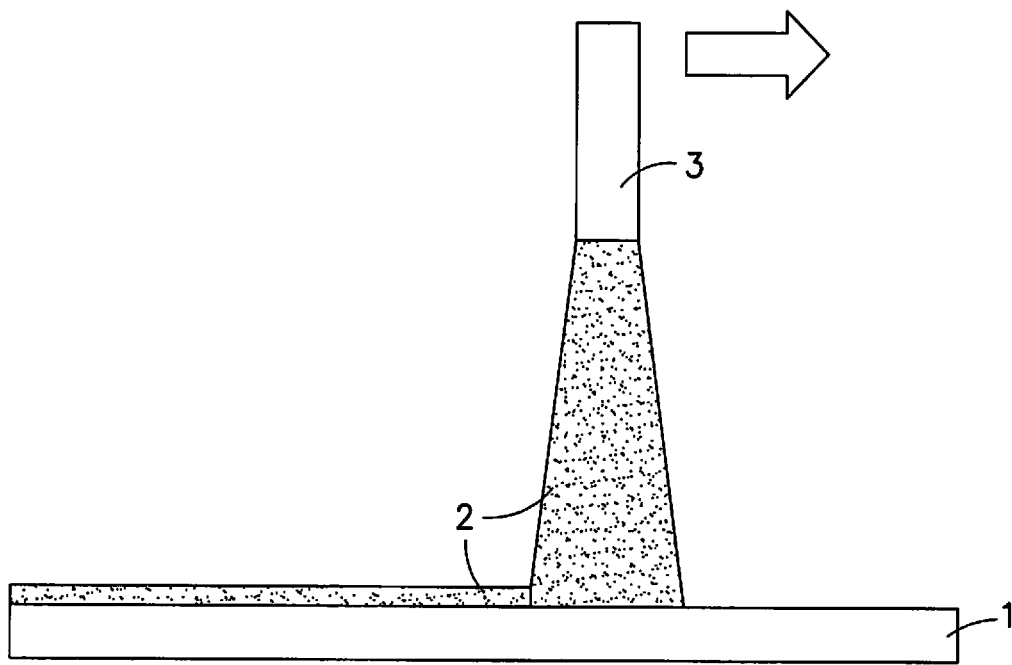
FIG. 1 is a side view of spraying of a liquid agent onto a surface of an SUS (a second adherend) and in FIG. 1, 1 represents an SUS (the second adherend), 2 represents a liquid agent of the reactive layer, and 3 represents a spraying head.

Hereinafter, details of the present invention will be described.

The first aspect of the present invention provides a sheet adhesive including a substrate layer and a reactive layer, wherein the substrate layer includes a component (A) and a component (B) below, and the reactive layer is formed with a liquid agent including from 0.01% by mass to 45% by mass of a component (C) below.

The second aspect of the present invention provides a sheet adhesive as described in the first aspect, wherein the component (B) includes an epoxy resin which is solid at 25° C.

The third aspect of the present invention provides a sheet adhesive as described in the first aspect or the second aspect, wherein the substrate layer is a substrate layer formed with the component (A) and the component (B) in a state compatibilized with each other.

The fourth aspect of the present invention provides a sheet adhesive as described in any one of the first aspect to the third aspect, wherein the liquid agent further includes a coupling agent as component (E).

The fifth aspect of the present invention provides a thermal curing-type sheet adhesive which includes a sheet adhesive as described in any one of the first aspect to the fourth aspect.

The sixth aspect of the present invention provides a normal temperature curing-type sheet adhesive which includes a sheet adhesive as described in any one of the first aspect to the fourth aspect.

The seventh aspect of the present invention provides an adhesion process which includes a first step of forming a substrate layer including the component (A) and the component (B) below on a first adherend; a second step of forming a reactive layer by coating the second adherend with a liquid agent including a component (D) below, and the component (C) below at a content of from 0.01% by mass to 45% by mass, which is then dried; and a third step of bonding the substrate layer and the reactive layer to each other.

The eighth aspect of the present invention provides an adhesion process as described in the seventh aspect, wherein the liquid agent further includes a component (E) below, in the second step.

The ninth aspect of the present invention provides a process of producing a sheet adhesive which includes a substrate layer including the component (A) and the component (B) below, and a reactive layer; which includes a step of forming the reactive layer on the second adherend by using a liquid agent including the component (D) below, and the component (C) below at a content of from 0.01% by mass to 45% by mass; and a step of bonding the substrate layer and the reactive layer to each other.

The tenth aspect of the present invention provides a process of producing a sheet adhesive which includes a substrate layer including the component (A) and the component (B) below, and a reactive layer; which includes a step of forming the reactive layer on the substrate layer by using a liquid agent including the component (D) below, and the component (C) below at a content of from 0.01% by mass to 45% by mass.

The eleventh aspect of the present invention provides a kit for forming a sheet adhesive which includes a substrate layer including the component (A) and the component (B) below, and a liquid agent including the component (C) and the component (D) below, wherein a content of the component (C) is 0.01% by mass to 45% by mass in the liquid agent;
component (A): a urethane elastomer,
component (B): an epoxy resin,
component (C): an amine compound and/or phenol compound,
component (D): a solvent.

The present invention realizes a sheet adhesive capable of adhering in a low temperature (from 20 to 90° C.) which exhibits a high adhesiveness. In addition, the sheet adhesive of the present invention is not squeezed out from an end part when used in bonding. Namely, the sheet adhesive of the present invention is also excellent in a squeeze-out characteristic.

<Substrate Layer>

In the present invention, a substrate layer essentially includes the component (A) and the component (B).

The substrate layer is formed with a raw liquid for forming a substrate layer (hereinbelow, also simply referred to as "raw liquid"). The raw liquid essentially includes the component (A) and the component (B), and from a viewpoint of control of viscosity at applying the raw liquid, or control of thickness of the coat after dried, the raw liquid preferably further includes a component (D) which will be described later. The raw liquid is applied onto an adherend such as a release paper, and then, a solvent or the like is dried, to form a substrate layer. Hereinbelow, a state before dried is ref erred to as "raw liquid", and a state after dried is referred to as "substrate layer".

In the present invention, thickness of the substrate layer is not particularly limited, and a thickness in a dry condition (a state after dried) is preferably from 10 to 200 µm, more preferably 20 to 150 µm, from a viewpoint of improvement of peeling/adhering strength.

[Component (A)]

The component (A) is a urethane elastomer. As the component (A), a urethane elastomer supplied in a solid state such as in a shape of plate or pellets, or in a liquid state such as in a state of varnish or emulsion may be used. The component (A) also preferably is one soluble in the component (D) which will be described later.

In the present invention, a urethane elastomer refers to an elastomer including a urethane bond, which is produced by an addition react ion of: a polyol compound having a polyether skeleton, adipate skeleton, polyester skeleton, polycarbonate skeleton, or the like with: a compound having an isocyanate group. Particularly preferred are adipate-type urethane elastomers and/or a polycarbonate-type urethane elastomers, from a viewpoint of compatibility with the component (B) and the adhesiveness to an adherend.

In the present invention, specific examples of the component (A) in a solid state such as in a shape of plate or pellets may include an adipate-type polyurethane elastomer P22SRNAT, and a polycarbonate-type polyurethane elastomer E980, etc., manufactured by Nippon Miractran Co, Ltd.; and IB-104, IB-114B, IB-1700D, IB-2000, manufactured by Sanyo Chemical Industries, Ltd., but are not limited thereto. Specific examples of the component (A) in a liquid state such as in a state of varnish or emulsion may include HUX-386, HUX-561S, HUX-420A, HUX-830, HUX-895, etc. as BONTIGHTER series manufactured by ADEKA CORPORATION, and UA-150, UA-200, UA-300, UA-310, UA-368, UA-4000, UCOAT UWS-145 as PERMARIN series manufactured by Sanyo Chemical Industries, Ltd., as aqueous emulsion type, but are not limited thereto.

[Component (B)]

In the present invention, the component (B) is an epoxy resin. Here, an epoxy resin only has to include an epoxy group in a molecule, and involves phenoxy resins having an epoxy group. The component (B) preferably is an epoxy resin having two or more epoxy groups and a bisphenol skeleton in a molecule. It is also preferred that the component (B) is one capable of being compatibilized with the component (A) by heating or the like, so as to be in a state of being dispersed into each other. It is more preferred that the component (B) is one capable of becoming transparent when compatibilized or dispersed.

In the present invention, it is preferred that the substrate layer is a substrate layer formed with the component (A) and the component (B) in a state compatibilized with each other. This is because when the component (A) and the component (B) are in a state of being compatibilized with each other, the component (B) will not be bled out from the substrate layer due to a heating or a press-bonding at the time of bonding.

It is preferred that the component (B) includes an epoxy resin which is solid at 25° C., from a viewpoint of preventing the component (B) from bleeding out from a substrate layer. It is also preferred that the epoxy equivalent of the component (B) is 400 g/eq or more. The component (B) may also be a mixture of an epoxy resin which is in a liquid state at 25° C. and an epoxy resin which is solid at 25° C.

Specific examples of the component (B) may include epoxy resins of bisphenol A-type, bisphenol F-type, phenol novolac-type, cresol novolac-type, and the like, but are not limited thereto. Specific examples of the epoxy resin may include: EPICLON 840, 840S, 850, 850S, 850CRP, 850LC, 830, 830S, 830LVP, 835, 835LV, etc. manufactured by DIC Corporation, and 827, 828, 834, 806, 807, etc. of jER series manufactured by Mitsubishi Chemical Corporation, as those in a liquid state at 25° C.; and EPICLON 860, 1050, 1055, 3050, 4050, 7050, N660, N665, N670, N673, N680, N695, etc. manufactured by DIC Corporation, and jER1001, 1002, 1003, 1055, 1004, 1004AF, 1007, 4005P, 4007P, 4010P, etc. manufactured by Mitsubishi Chemical Corporation, as those solid at 25° C.; but are not limited thereto. Specific examples of the phenoxy resin may include 1256, 4250, 4275, 1256B40, 1255HX30, etc. of jERseries manufactured by Mitsubishi Chemical Corporation, and YP-50, YP-50S, YP-40ASM40, YP-50EK35, etc. manufactured by NIPPON STEEL & SUMIKIN CHEMICAL CO., LTD., but are not limited thereto. It is also possible to use a product diluted with a solvent. In this connection, when a product diluted with a solvent is used as the component (B), a solid content of the product belongs to the component (B), and a solvent part belongs to the component (D) which will be described later.

It is preferred that the component (B) is from 1 to 40% by mass with respect to a total of the component (A) and the component (B). When the component (B) is more than 1% by mass, the component (B) reacts with the component (C)

to exhibit an adhesive strength. On the other hand, when the component (B) is less than 40% by mass, a softness of a cured product is maintained, which will contribute to an improvement of adhering strength.

<Reactive Layer>

In the present invention, a reactive layer includes the component (C).

The reactive layer is formed with a liquid agent for forming a reactive layer (hereinbelow, also simply referred to as "liquid agent"). The liquid agent essentially includes the component (C), and may include another component, according to need. For example, it is preferred to further include the component (D) which will be described later, from a viewpoint of controlling a viscosity of the component (C). It is also preferred to further include a component (E) which will be described later, from a viewpoint of improving a close-adhesiveness to an adherend.

In the present invention, the component (C) is from 0.01% by mass to 45% by mass, with respect to a total of the liquid agent. In the liquid agent, when the component (C) is more than 45% by mass, the reactive layer to be formed will be too thick and squeezed out when bonded to the substrate layer. In addition, the component (C) is preferably 0.01% by mass or more, more preferably 0.5% by mass or more, particularly preferably 1.0% by mass or more, with respect to a total of the liquid agent. When the component (C) is 0.01% by mass or more, adhering strength is enhanced, and when the component (C) is 45% by mass or less, it is possible to reduce the squeeze out of the component (C) at the time of curing. In this connection, "squeeze out" refers to a phenomenon that fluidity is generated in the substrate layer due to a heating or a press-bonding at the time of bonding, to cause a change of original dimension or a bleeding out.

In the present invention, a liquid agent is applied onto an adherend, and solvent or the like is dried, to form a reactive layer. Hereinbelow, a state before dried is referred to as "liquid agent", and a state after dried is referred to as "reactive layer".

[Component (C)]

In the present invention, the component (C) is an amine compound and/or a phenol compound, having a role of curing the component (B) (also referred to as "curing agent for component (B)"). The component (C) may be an amine compound alone, may be a phenol compound alone, and may include both of amine compound and phenol compound. The component (C) may be either liquid or solid at 25° C. The component (C) may be either a component of a single kind or a mixture of two or more kinds, as long as it is a curing agent capable of forming a cured product by being reacted with an epoxy resin which is the component (B); and may alternatively be a component produced by compatibilizing a curing agent which is liquid at 25° C. with a curing agent which is solid at 25° C., or by dispersing one into the other.

In this connection, the component (C) overlaps neither with the component (A) nor the component (B).

As the amine compound, an imidazole compound, an epoxy adduct-type amine compound, a dicyandiamide, a dihydrazide compound, and other amine compound may be used.

The imidazole compound may include imidazole, 2-methylimidazole, 2-heptadecilimidazole, 2-heptadecilimidazole, 1,2-dimethylimidazole, 2-ethyl-4-methyimidazole, 2-phenylimidazole, 2-phenylimidazole, 2-pheny-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazin e, 2,4-diamino-6-[2'-methylimidazolyl-(1')]-ethyl-s-triazin e, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, etc., but is not limited thereto. Specific products of the imidazole compound may include SIZ, 2MZ-H, C11Z, C172, 1.2DMZ, 2E4MZ, 2PZ, 2PZ-PW, 2P4MZ, 1B2MZ, 1B2PZ, 2MZ-CN, C11Z-CN, 2E4MZ-CN, 2PZ-CN, C11Z-CNS, 2PZCNS-PW, 2MZ-A, 2MZA-PW, C11Z-A, 2E4MZ-A, 2MA-OK, 2MAOK-PW, 2PZ-OK, 2PHZ-PW, 2P4MHZ-PW, etc. of CUREZOL series manufactured by SHIKOKU CHEMICALS CORPORATION, but are not limited thereto.

The epoxy adduct-type amine compound may include PN-23, PN-H, PN-31, PN-40, PN-50, PN-F, PN-23J, PN-31J, PN-40J, MY-24, MY-25, etc. as AMICURE series manufactured by Ajinomoto Fine-TechnoCo., Inc.; FXE-1000, FXR-1020, FXR-1030, FXR-1081, FXR-1020, FXR-1121, etc. as Fujicure series manufactured by T&K TOKA CO., LTD.; and HX-3921HP, HX-3941HP, HX-3088 as Novacure series manufactured by Asahi Kasei E-materials Corp., but is not limited thereto.

The dicyandiamide may include Omicure DDA-5, etc. manufactured by PTI JAPAN LTD.; DICY7, DICY15, DICY50, etc. manufactured by Mitsubishi Chemical Corporation; and DD, D25F, etc. manufactured by NIPPON CARBIDE INDUSTRIES CO., INC., but is not limited thereto.

The dihydrazide compound may include adipic acid dihydrazide, sebacic acid dihydrazide, dodecane dihydrazide, isophthalic acid dihydrazide, salicylic acid hydrazide, 1,3-bis(hydrazinocarbonoethyl)-5-isopropylhydantoin, 7,11-octadecadiene-1,18-dicarbohydrazide, etc., but is not limited thereto. Specific products may include ADH, SDH, DDH, IDH, SAH, etc. manufactured by Otsuka Chemical Co., Ltd.; and VDH-J, UDH, etc. as AMICURE series manufactured by Ajinomoto Fine-Techno Co., Inc., but are not limited thereto.

The other amine compounds may include 1,2,3-benzotriazole, but are not limited thereto.

The phenol compound may include phenol novolac polymers, bisphenol A novolac polymers, cresol novolac polymers, polyparavinylphenol polymers, etc. Specific examples may include TD-2131, TD-2106, VH-4150, VH-4170, KA-1160, KA-1163, etc. manufactured by DIC Corporation; MARUKA LYNCUR M manufactured by Maruzen Petrochemical Co., Ltd.; and MEH-7500 series, MEH-7851 series, etc. as Meiwa Plastic Industries, Ltd., but are not limited thereto.

[Component (D)]

In the present invention, the component (D) is a solvent. At the time of preparing a raw liquid that forms the substrate layer, and a liquid agent that forms the reactive layer, it is possible to suitably use the component (D). Component (D) used in the raw liquid and that used the liquid agent may be different from each other or may be the same.

Specific examples of the component (D) may include 1,3-dioxolane, methanol, isopropyl alcohol (IPA), toluene, xylene, methylethylketone, ethyl acetate, dimethylformamide (DMF), water, etc., but are not limited thereto.

[Component (E)]

In the present invention, it is preferred that the reactive layer further includes a coupling agent as component (E). By including the component (E), it is possible to improve close-adhesiveness to an adherend.

The component (E) is a coupling agent. Particularly preferred is a silane coupling agent having a hydrolyzable silyl group in a molecule. Specific examples of the component (E) may include silane coupling agents of 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl) 3-aminopropylmethyldimethoxysilane, N-(2-aminoethyl) 3-aminopropylmethyltrimethoxysilane, 3-aminopropyltriethoxysilane, 3-mercaptopropyltrimethoxysilane, vinyltrimethoxysilane, N-(2-(vinylbenzyl amino) ethyl) 3-aminopropyltrimethoxysilane hydrochloride, 3-methacryloxypropyltrimethoxysilane, etc., but are not limited thereto. Two or more kinds of these silane coupling agents may be mixed.

A coupling agent which includes an amino group as the component (E) does not overlap with the component (C).

In preparing a liquid agent including the component (C), the component (D), and the component (E), it is preferred to add 0.1 to 200 parts by mass of the component (E) with respect to 100 parts by mass of the component (C). Particularly preferred is 0.1 to 50 parts by mass. The component (E) of 0.1 parts by mass or more can contribute to stabilization of adhesive strength, and the component (B) of 200 parts by mass or less can contribute to stability during storage, sometimes controlling an outgassing.

In the present invention, weight of the liquid agent per unit area of the reactive layer is not particularly limited. From a viewpoint of securing an optimum amount of residue in a reaction with the substrate layer, it is preferred that a total weight of the component (C) and the component (E) which is blended according to need per unit area of the reactive layer is from 0.05 to 10 mg/cm$^2$, under a condition without a solvent of the reactive layer.

[Filler]

In the present invention, a filler may also be used according to need. The filler may include inorganic particles and/or organic particles. The inorganic particles may include alumina powder, calcium carbonate powder, talc powder, silica powder, etc., but are not limited thereto. Addition of a filler allows controlling viscosity or thixotropy, and at the same time, allows dealing with enhancement of strength. Powder properties such as average particle size or shape of the inorganic particles are not particularly limited, but considering ease in dispersing, the average particle size is preferably from 0.001 to 50 μm. Addition amount of the filler may appropriately be controlled, and preferably is from 0.1 to 50% by mass with respect to a total of the component (A) and the component (B). The organic particles may include styrene particles, rubber particles of butadiene rubbers, acrylic rubbers, etc., polypropylene particles, etc. As the organic particles, those of butadiene rubbers and/or acrylic rubbers are particularly preferred. An average particle size of the rubber particles is preferably from 0.05 to 0.5 μm. Core-shell-type rubber particles are the most preferred, considering viscosity variation due to swelling. It is also possible to use rubber particles dispersed in an epoxy resin in advance. Specifically, those correspond thereto are rubber particles dispersed in an epoxy resin by a mixing-stirring device such as a hyper and a homogenizer, and rubber particles synthesized within an epoxy resin by an emulsion polymerization. Average particle size of rubber particles finally formed by a method using an emulsion polymerization is preferably from 0.05 to 0.5 μm. Specific example of the butadiene rubber particles may include Metablen E series, Metablen C series, etc., manufactured by Mitsubishi Rayon Co., Ltd., etc. Specific examples of the acrylic rubber particles may include MX series manufactured by Soken Chemical & Engineering Co., Ltd.; Metablen W series manufactured by Mitsubishi Rayon Co., Ltd.; ZEFIAC series manufactured by ZEON KASEI Co., Ltd., etc. Specific examples of the epoxy resin in which rubber particles are dispersed in advance may include RKB series manufactured by Resinous Kasei Co., Ltd., etc. Specific examples of the epoxy resin in which the emulsion polymerization is used include ACRYSET BP series manufactured by NIPPON SHOKUBAI CO., LTD., etc., but are not limited thereto.

The sheet adhesive of the present invention may be a normal temperature curing-type sheet adhesive and may also be a thermal curing-type sheet adhesive. As used herein, the "normal temperature curing-type" refers to those capable of bonding a substrate layer and a reactive layer to each other at a normal temperature (from 20 to 30° C.), and the "thermal curing-type" refers to those capable of bonding a substrate layer and a reactive layer to each other by intentionally applying a heat exceeding the normal temperature.

The sheet adhesive of the present invention may be added with a reactive diluent, a coloring agent such as a pigment, a dye, etc., an additive such as a plasticizer, an antioxidant, an antifoam, an anti-aging agent, a leveling agent, a rheology controller, etc., at an appropriate amount, within a range by which an expected effect of the present invention is not impaired. By the addition, it is possible to obtain a composition excellent in resin strength, adhering strength, workability, preservability, etc. and a cured product thereof.

<Process of Producing Sheet Adhesive>

The present invention also provides a process of producing the sheet adhesive described above.

Namely, the present invention provides a process of producing a sheet adhesive which includes a substrate layer including a component (A) and a component (B) below and a reactive layer, which includes a step of forming the reactive layer on the second adherend by using a liquid agent that includes a component (D) below, and a component (C) below at a content of from 0.01% by mass to 45% by mass; and a step of bonding the substrate layer and the reactive layer to each other (hereinbelow also referred to as "production process 1").

The present invention also provides another process of producing the sheet adhesive described above. Namely, the present invention provides a process of producing a sheet adhesive which includes a substrate layer including the component (A) and the component (B) below and a reactive layer, which includes a step of forming the reactive layer on the substrate layer by using a liquid agent that includes the component (D) below, and the component (C) below at a content of from 0.01% by mass to 45% by mass (hereinbelow also referred to as "production process 2");

component (A): a urethane elastomer,
component (B): an epoxy resin,
component (C): an amine compound and/or phenol compound,
component (D): a solvent.

In the production process 1 and the production process 2, the component (A), the component (B), the component (C), and the component (D) are as described above, and here an explanation thereof will be omitted.

A substrate layer according to the production process 1 or the production process 2 only has to be in an aspect including the component (A) and the component (B). For example, it is possible to use either the "substrate layer including the component (A) and the component (8)" as it is, which is a part of the kit as described later, or one prepared from a raw liquid including the component (A) and the component (B). In the latter, specifically, a raw liquid including the component (A) and the component (B) may be prepared, which may be added with the component (D) according to need. After that, a coating (a substrate layer) may be formed, for example, by applying the raw liquid onto the first adherend and then dried by heating or the like. Content of the raw liquid is preferably from 5 to 60% by mass.

In the step of forming the reactive layer, it is preferred that the liquid agent includes the component (C) and the component (D), and further includes the component (E) as described above. The liquid agent only has to be prepared such that a content of the component (C) is from 0.01% by mass to 45% by mass with respect to a total of the liquid agent. In the case of the production process 1, the subsequent step may be, for example, a process of applying the liquid agent to the second adherend such as stainless, by a spraying as in FIG. 1, or a brush painting, which is then dried at a normal temperature (from 20 to 30° C.) by heating or the like, to form the reactive layer. In this connection, in a case where the component (E) is included, concentration of the component (E) in the liquid agent is not particularly limited, but preferably is 45% by mass or less. As for the case of production process 2, the process includes a process of directly applying the liquid agent onto the substrate layer, which is then dried, for example at a normal temperature (from 20 to 30° C.), or by heating, to form a reactive layer.

In this connection, the drying (which means both of a drying at the time of forming the substrate layer and a drying at the time of forming the reactive layer) is preferably performed at a heating temperature of from 50 to 150° C., to dry the solvent (for example, the component (D)) and at the same time, not to deteriorate the substrate layer or the reactive layer. The drying process may includes normal temperature standing, use of a hot-air drying furnace, an IR furnace, or the like, but is not limited thereto. Thickness of the substrate layer is preferably from 30 to 300 μm and from 2.0 to 60 mg/cm$^2$ in a dry condition. The reactive layer is preferably from 0.05 to 10 mg/cm$^2$ in a condition without solvent.

In the present invention, the "first adherend" refers to an object that supports the substrate layer, and the "second adherend" refers to an object that supports the reactive layer.

The "first adherend" is not particularly limited as long as it is an object capable of supporting the substrate layer according to the present invention, and for example, a film is preferably used. Specific examples of the film may include PET (polyethylene terephthalate), AL-PET (aluminum vapor-deposited PET), OPP (oriented polypropylene), etc. The film is not limited to those having the film surface release-processed or not. However, from a viewpoint of ease in handling, those having the film surface release-processed, for example, release papers are preferably used.

The "second adherend" is not particularly limited as long as it is an object capable of supporting the reactive layer according to the present invention, and preferably used are, for example, a film of PET (polyethylene terephthalate), AL-PET (aluminum vapor-deposited PET), OPP (oriented polypropylene), etc., and a stainless such as a stainless plate made of SUS304. According to a use condition, it is also possible to form a reactive layer on a surface of a formed substrate layer (in a condition after dried). Namely, the substrate layer may be regarded as the "second adherend".

Figure 2:
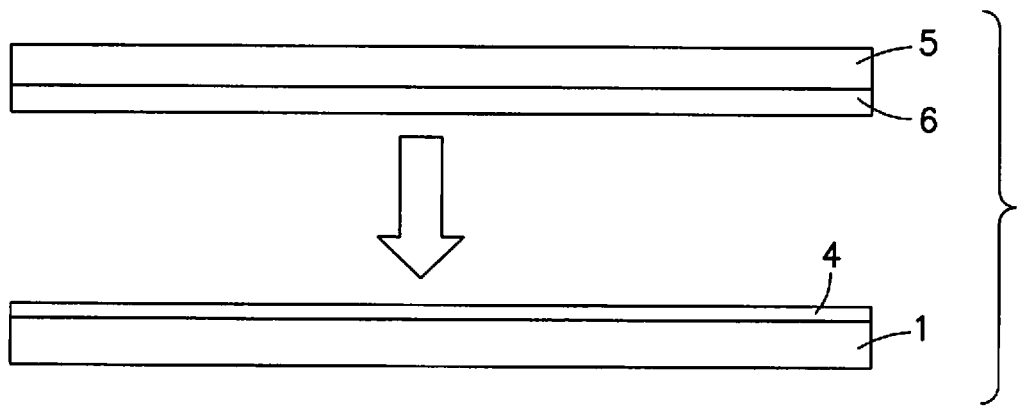
FIG. 2 is a side view of a state where the SUS including a reactive layer on which the sprayed liquid agent has been dried is being bonded to a PET (a first adherend) on which a substrate layer has been formed and in FIG. 2, 1 represents the SUS (the second adherend), 4 represents the reactive layer, 5 represents the PET (the first adherend), and 6 represents the substrate layer.
Figure 3:
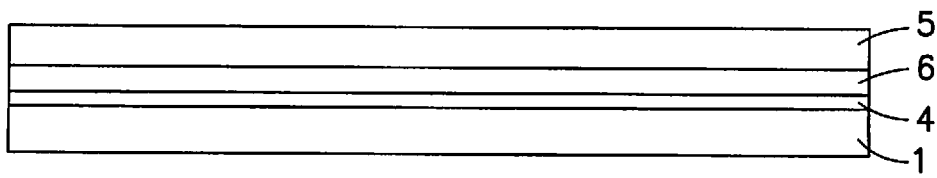
FIG. 3 is a side view of a laminate of FIG. 2 in a state after bonded and in FIG. 3, 1 represents the SUS (the second adherend), 4 represents the reactive layer, 5 represents the PET (the first adherend), and 6 represents the substrate layer.

In the step of bonding the substrate layer and the reactive layer to each other according to the production process 1 of the present invention, it is possible to adhere the substrate layer and the reactive layer by overlapping the layers and then bonding the layers to each other as in FIG. 2 by a thermo compression bonding-type press machine or a laminator. The press-bonding is preferably performed at a pressure of from 0.05 to 1.0 MPa, under an atmosphere of heating of from 20 to 90° C. for from 5 to 60 seconds. After the press-bonding, the resultant may be left standing under an atmosphere of from 20 to 90° C. At the time of heating, a hot-air drying furnace or the like may be used.

<Adhesion Process>

The present invention provides an adhesion process which includes the first step of forming a substrate layer including a component (A) and a component (B) below on the first adherend; the second step of forming a reactive layer by coating the second adherend with a liquid agent including a component (D) below, and a component (C) below at a content of from 0.01% by mass to 45% by mass, which are then dried, and the third step of bonding the substrate layer and the reactive layer to each other;

component (A): a urethane elastomer,
component (B): an epoxy resin,
component (C): an amine compound and/or phenol compound,
component (D): a solvent.

The present invention also provides an adhesion process, wherein the liquid agent further includes a component (B) below, in the second step;

component (E): a coupling agent.

In this connection, the third step of bonding the substrate layer and the reactive layer to each other is the same as explained in the step of bonding the substrate layer and the reactive layer to each other according to the production process 1 described above, and here an explanation thereof will be omitted.

Details of the component (A), the component (B), the component (C), the component (D), and the component (E) are as described above, and here an explanation thereof will be omitted.

<Kit>

The present invention also provides a kit for forming a sheet adhesive. More specifically, provided is a kit which includes a substrate layer including a component (A) and a component (B) below, and a liquid agent including a component (C) and a component (D) below;

component (A): a urethane elastomer,
component (B): an epoxy resin,
component (C): an amine compound and/or phenol compound,
component (D): a solvent,
wherein content of the component (C) is from 0.01% by mass to 45% by mass in the liquid agent.

In the kit of the present invention, it is preferred that the substrate layer including the component (A) and the component (B) is in an aspect that includes a release paper or the like on one or both of the surfaces, from a viewpoint of portability. When used, it is possible that the release paper is removed from the surface which is then stuck on one of objects of adhesion, while (i): the substrate layer is coated with a liquid agent including the component (C) and the component (D) and dried, and then bonded to the other object of adhesion; or (ii): the other object of adhesion is coated with the liquid agent including the component (C) and the component (D) and dried, and then bonded to the substrate layer.

It is also possible that the substrate layer including the component (A) and the component (B) is substituted with a raw liquid including the component (A) and the component (B). In this case, the raw liquid is applied to a release paper or to one of objects of adhesion and dried to form a substrate layer to be used.

In the kit of the present invention, the liquid agent may further include a component (E).

In this connection, details of the component (A), the component (B), the component (C), the component (D), and the component (E) are as described above, and here an explanation thereof will be omitted.

EXAMPLES

Herein after, the present invention will be explained further in detail with reference to the Examples. However, the present invention is not limited only to these Examples.

[Raw Liquids 1 to 3 and Liquid Agents 1 to 17]

To prepare the raw liquids and the liquid agents, the following components were provided;

component (A): a urethane elastomer
an adipate-type polyurethane elastomer (solid content: 100% by mass) (P22SRNAT manufactured by Nippon Miractran Co, Ltd.),
a polycarbonate-type polyurethane elastomer (solid content: 100% by mass) (E980 manufactured by Nippon Miractran Co, Ltd.),
component (A'): an elastomer other than component (A) (Rubber elastomer).
a 2%-maleic acid anhydride-modified SEBS (styrene-ethylene/butylene-styrene block copolymer) (Kraton FG1901GT manufactured by Kraton polymer Japan Corporation),
component (B): epoxy resin
a bisphenol A-type epoxy resin (jER1004 manufactured by Mitsubishi Chemical Corporation),
a bisphenol A-type phenoxy resin (solid content: 40% by mass, solvent: methylethylketone (MEK)) (jER1256B40 manufactured by Mitsubishi Chemical Corporation),
component (B'): a resin other than component (B)
an aromatic-modified terpene polymer (YS RESIN TO125 manufactured by YASUHARA CHEMICAL CO., LTD.),
component (C): an amine compound and/or phenol compound
2-phenylimidazole (25° C. solid) (CUREZOL 2PZ manufactured by SHIKOKU CHEMICALS CORPORATION),
2-methylimidazole (25° C. solid) (CUREZOL 2MZ manufactured by SHIKOKU CHEMICALS CORPORATION),
2-ethyl-4-methylimidazole (25° C. liquid) (CUREZOL 2E4MZ manufactured by SHIKOKU CHEMICALS CORPORATION),
dicyandiamide (Omicure DDA-5 manufactured by PTI JAPAN LTD.),
an epoxy adduct-type curing agent (AMICURE PN-23 Ajinomoto Fine-Techno Co., Inc.),
an epoxy adduct-type curing agent (Fujicure FXE-1000 manufactured by T&K TOKA CO., LTD.),
1,2,3-benzotriazole (Reagent),
1,3-bis(hydrazinocarbonoethyl)-5-isopropylhydantoin (AMICURE VDH-J Ajinomoto Fine-Techno Co., Inc.),
a polyparavinyl phenol polymer (MARUKA LYNCUR M manufactured by Maruzen Petrochemical Co., Ltd.),
component (C'): a curing agent other than component (C) (acid anhydride),
a mixture of 4-methylhexahydrophthalic acid anhydride and hexahydrophthalic acid anhydride (mass ratio: 70:30) (RIKACID MH-700N manufactured by New Japan Chemical Co., Ltd.),
component (D): solvent
1,3-dioxolane (reagent)
dimethylformamide (DMF) (reagent)
methylethylketone (MEK) (reagent)
toluene (reagent)
methanol (reagent)
isopropyl alcohol (IPA) (reagent)
component (E): a coupling agent
N-(2-aminoethyl)-3-aminopropyltrimethoxysilane (KBM-603 manufactured by Shin-Etsu Chemical Co., Ltd.),
3-aminopropyltrimethoxysilane (Z-6610 manufactured by Dow Corning Toray Co., Ltd.)
others
a talc powder (MICRO ACE L1 manufactured by Nippon Talc Co., Ltd.).

[Preparation of Raw Liquid and Formation of Substrate Layer]

The component (D) and the component (A) (or the component (A')) were weighed, put into beakers, and stirred for one hour. In a case where the component (A) remains undissolved, the stirring is performed for another one hour. Subsequently, the component (B) and the other components were weighed, put into the beakers, and stirred for one hour. Raw liquids 1 to 3 are applied onto aluminum foil sides of AL-PET films (trade name: AL-PET12-50 of PANAC Co., Ltd.) of length 200 mm×width 25 mm×thickness 65 μm, and dried under an atmosphere of 90° C. for 5 minutes to form substrate layers, which were listed with their thicknesses in a dry condition in Table 1. FG1901GT as the component (A') and the epoxy resin as the component (B) could not be compatibilized due to their polarity significantly different from each other. Here, the numbers of the "raw liquids" are also used as the numbers of the "substrate layers". Specific blending amounts are based on Table 1, and all numerical values are shown in part by mass. Additionally, solid contents of the raw liquids (% by mass) are shown.

TABLE 1

| | | Substrate layer | | |
|---|---|---|---|---|
| Component | Raw material | Raw liquid 1 | Raw liquid 2 | Raw liquid 3 |
| Component (A) | P22SRNAT | 75 | | |
| | E980 | | | 70 |

TABLE 1-continued

|  |  | Substrate layer | | |
|---|---|---|---|---|
| Component | Raw material | Raw liquid 1 | Raw liquid 2 | Raw liquid 3 |
| Component (A') | FG1901GT |  |  | 60 |
| Component (B) | jER1004 | 25 |  |  |
|  | jER1256B40 (Solid content) |  | 30 |  |
| Component (B') | YS RESIN TO125 |  |  | 40 |
| Component (D) | 1,3-dioxoiane | 175 |  |  |
|  | DMF |  | 630 |  |
|  | MEK | 100 |  |  |
|  | MEK (jER1256B40-derived) |  | 45 |  |
|  | Toluene |  |  | 300 |
| Other component | MICRO ACE K1 | 5 |  |  |
|  | Total | 380 | 775 | 400 |
|  | Solid content | 28 | 13 | 25 |
|  | Thickness of substrate layer | 50 μm | 50 μm | 100 μm |

[Preparation of Liquid Agent and Formation of Reactive Layer]

The component (D) was weighed, put into beakers, and after that, the component (C) (or the component (C')) and the component (E) were weighed, put into beakers, and stirred for 15 minutes. Then, states of the components dissolved in the liquid agent are visually checked, and evaluated as "soluble" according to the following evaluation criteria. "Component concentration" of the component (C) (or the component (C')) and the component (E) with respect to the total liquid agent are additionally shown in % by mass. Specific blended amounts are in accordance with Table 2, and all the numerical values are shown in part by mass. After the preparation of the liquid agents, the liquid agents 1 to 17 were applied onto stainless plates made of SUS304 of length 100 mm×width 25 mm×thickness 1.5 mm, and left standing at 25° C. for one hour so as to be dried, to form reactive layers. Here, the numbers of the "liquid agents" are also used as the numbers of the "reactive layers". For example, the liquid agent 1 corresponds to "reactive layer 1"

Evaluation Criteria

○: compatibilized x: partially undissolved

TABLE 2

| | | Reactive layer | | | | | | | | |
|---|---|---|---|---|---|---|---|---|---|---|
| Component | Raw material | Liquid agent 1 | Liquid agent 2 | Liquid agent 3 | Liquid agent 4 | Liquid agent 5 | Liquid agent 6 | Liquid agent 7 | Liquid agent 8 | Liquid agent 9 |
| Component (C) | 2PZ | 1.0 | 3.0 | 5.0 | 10.0 |  |  |  |  |  |
|  | 2MZ |  |  |  |  | 3.0 |  |  |  |  |
|  | 2E4MZ |  |  |  |  |  | 30.0 | 50.0 |  |  |
|  | DDA-5 |  |  |  |  |  |  |  | 5.0 |  |
|  | PN-23 |  |  |  |  |  |  |  |  | 5.0 |
|  | FXE-1000 |  |  |  |  |  |  |  |  |  |
|  | 1,2,3-benzotriazole |  |  |  |  |  |  |  |  |  |
|  | VDH-J |  |  |  |  |  |  |  |  |  |
|  | MARUKA LYNCUR-M |  |  |  |  |  |  |  |  |  |
| Component (C') | MH-700N |  |  |  |  |  |  |  |  |  |
| Component (E) | KBM-603 |  |  |  |  |  |  |  |  |  |
|  | Z-6610 |  |  |  |  |  |  |  |  |  |
| Component (D) | Methanol | 99.0 | 97.0 | 95.0 | 90.0 |  |  |  |  | 25.0 |
|  | IPA |  |  |  |  | 97.0 |  |  |  |  |
|  | MEK |  |  |  |  |  | 70.0 | 50.0 |  |  |
|  | DMF |  |  |  |  |  |  |  | 95.0 |  |
|  | Toluene |  |  |  |  |  |  |  |  | 70.0 |
|  | Total | 100.0 | 100.0 | 100.0 | 100.0 | 100.0 | 100.0 | 100.0 | 100.0 | 100.0 |
|  | Component concentration | 1.0 | 3.0 | 5.0 | 10.0 | 3.0 | 30.0 | 50.0 | 5.0 | 5.0 |
|  | Solubility | ○ | ○ | ○ | ○ | ○ | ○ | ○ | X | ○ |

| | | Reactive layer | | | | | | | |
|---|---|---|---|---|---|---|---|---|---|
| Component | Raw material | Liquid agent 10 | Liquid agent 11 | Liquid agent 12 | Liquid agent 13 | Liquid agent 14 | Liquid agent 15 | Liquid agent 16 | Liquid agent 17 |
| Component (C) | 2PZ |  |  |  |  |  |  | 5.0 | 10.0 |
|  | 2MZ |  |  |  |  |  |  |  |  |
|  | 2E4MZ |  |  |  |  |  |  |  |  |
|  | DDA-5 |  |  |  |  |  |  |  |  |
|  | PN-23 |  |  |  |  |  |  |  |  |
|  | FXE-1000 | 10.0 |  |  |  |  |  |  |  |
|  | 1,2,3-benzotriazole |  | 10.0 |  |  |  |  |  |  |

TABLE 2-continued

| | | | | | | | | | | |
|---|---|---|---|---|---|---|---|---|---|---|
| | VDH-J | | | | 5.0 | | | | | |
| | MARUKA LYNCUR-M | | | | | | 10.0 | | | |
| Component (C') | MH-700N | | | | | 10.0 | | | | 10.0 |
| Component (E) | KBM-603 | | | | | | | | 1.0 | 1.0 |
| | Z-6610 | | | | | | | | 0.1 | |
| Component (D) | Methanol | 90.0 | | 95.0 | | | | 94.0 | 89.9 | |
| | IPA | | 90.0 | | | | | | | |
| | MEK | | | | | | 90.0 | | | |
| | DMF | | | | | | | | | |
| | Toluene | | | | | 90.0 | | | | 89.0 |
| | Total | 100.0 | 100.0 | 100.0 | 100.0 | 100.0 | 100.0 | 100.0 | 100.0 | |
| | Component concentration | 10.0 | 10.0 | 5.0 | 10.0 | 10.0 | 6.0 | 10.1 | 11.0 | |
| | Solubility | ○ | ○ | ○ | ○ | ○ | ○ | ○ | ○ | |

[Combination of Substrate Layer and Reactive Layer]

The substrate layers and the reactive layers were combined according to Table 3, and every check and measurement were performed. In Table 3, a case without reactive layer is shown as "None" reactive layer.

Evaluation Criteria
○: No squeeze-out from end part
×: Squeezed-out from end part

[Measurement of Peeling/Adhering Strength]

The substrate layers formed on the AL-PET surfaces and the reactive layers formed on the stainless plate surfaces

TABLE 3

| Test item | Example 1 | Example 2 | Example 3 | Example 4 | Example 5 | Example 6 | Example 7 | Example 8 | Example 9 |
|---|---|---|---|---|---|---|---|---|---|
| Substrate layer | Raw liquid 1 | Raw liquid 1 | Raw liquid 1 | Raw liquid 1 | Raw liquid 1 | Raw liquid 1 | Raw liquid 1 | Raw liquid 1 | Raw liquid 1 |
| Reactive layer | Liquid agent 1 | Liquid agent 2 | Liquid agent 3 | Liquid agent 4 | Liquid agent 5 | Liquid agent 6 | Liquid agent 8 | Liquid agent 9 | Liquid agent 10 |

| Test item | Example 10 | Example 11 | Example 12 | Example 13 | Example 14 | Example 15 | Example 16 | Comparative example 1 | Comparative example 2 |
|---|---|---|---|---|---|---|---|---|---|
| Substrate layer | Raw liquid 1 | Raw liquid 1 | Raw liquid 1 | Raw liquid 1 | Raw liquid 1 | Raw liquid 2 | Raw liquid 2 | Raw liquid 1 | Raw liquid 1 |
| Reactive layer | Liquid agent 11 | Liquid agent 12 | Liquid agent 14 | Liquid agent 15 | Liquid agent 16 | Liquid agent 15 | Liquid agent 16 | Liquid agent 13 | Liquid agent 7 |

| Test item | Comparative example 3 | Comparative example 4 | Comparative example 5 | Comparative example 6 | Comparative example 7 | Comparative example 8 | Comparative example 9 | Comparative example 10 |
|---|---|---|---|---|---|---|---|---|
| Substrate layer | Raw liquid 1 | Raw liquid 1 | Raw liquid 2 | Raw liquid 2 | Raw liquid 3 | Raw liquid 3 | Raw liquid 3 | Raw liquid 3 |
| Reactive layer | None | Liquid agent 17 | Liquid agent 17 | None | Liquid agent 17 | None | Liquid agent 15 | Liquid agent 16 |

With respect to Examples 1 to 12 and Comparative examples 1 to 3, in which the substrate layer 1 was used, measurements of the squeeze-out characteristic and the peeling/adhering strength were performed. Results of the measurements were collected in Table 4.

[Check of Squeeze-Out Characteristic]

The substrate layers formed on the AL-PET surfaces and the reactive layers formed on the stainless plate surfaces were bonded to each other by a press machine at a pressure of 0.2 MPa, under an atmosphere of heating of 70° C., taking 30 seconds. Then, the reactive layers were visually checked for whether it is squeezed-out from an end part, and judged for the "squeeze-out characteristic", on the basis of the following evaluation criteria. As for Comparative examples 3, 6, and 8, a stainless plate without a reactive layer is bonded to the substrate layer formed on the AL-PET surface. Therefore, the "squeeze-out characteristic" is shown as "–". The squeeze-out characteristic is preferably "○", in order to prevent expansion to area surrounding an adherend.

were bonded to each other throughout an adhesion area of 25 mm×80 mm, and then bonded to each other by a press machine manufactured by Mikado Technos Co., Ltd. (trade name: Vacuum-pressurizing device) at a pressure of 0.2 MPa, in two kinds of: under an atmosphere of heating of 25° C., taking 30 seconds; and under an atmosphere of heating of 70° C., taking 30 seconds. Then, after left standing under an atmosphere of 25° C. for 24 hours, the layers were peeled off from each other by a drawing test apparatus at a rate of 300 mm/minute in 180° direction. A maximum strength is set as a "measured value of adhering strength (N/m)", and a change in the measured values from Comparative example 3 using the same substrate layer without using a reactive layer is set as "improvement rate of adhering strength (%)". In Comparative example 3, a stainless plate without a reactive layer was bonded to the substrate layer formed on the AL-PET surface. Therefore, the "improvement rate of adhering strength" of Comparative example 3 is shown as "–". In the present invention, the improvement rate of adhering strength due to the reactive layer is preferably 5% or more, more preferably 10% or more, particularly preferably 20% or more.

TABLE 4

| Test item | | Example 1 | Example 2 | Example 3 | Example 4 | Example 5 |
|---|---|---|---|---|---|---|
| Squeeze-out property | | ○ | ○ | ○ | ○ | ○ |
| Adhering strength | Measured value (25° C.) | 714 | 1104 | 1125 | 1514 | 881 |
| | Improvement rate (25° C.) | 41 | 118 | 122 | 198 | 73 |
| | Measured value (70° C.) | 1339 | 1497 | 1530 | 1682 | 1620 |
| | Improvement rate (70° C.) | 11 | 24 | 26 | 39 | 34 |

| Test item | | Example 6 | Example 7 | Example 8 | Example 9 | Example 10 |
|---|---|---|---|---|---|---|
| Squeeze-out property | | ○ | ○ | ○ | ○ | ○ |
| Adhering strength | Measured value (25° C.) | 1711 | 854 | 1115 | 1215 | 1162 |
| | Improvement rate (25° C.) | 237 | 68 | 120 | 139 | 129 |
| | Measured value (70° C.) | 1822 | 1335 | 1595 | 1616 | 1601 |
| | Improvement rate (70° C.) | 50 | 10 | 32 | 33 | 32 |

| Test item | | Example 11 | Example 12 | Comparative example 1 | Comparative example 2 | Comparative example 3 |
|---|---|---|---|---|---|---|
| Squeeze-out property | | ○ | ○ | ○ | X | — |
| Adhering strength | Measured value (25° C.) | 719 | 1399 | 750 | 1950 | 508 |
| | Improvement rate (25° C.) | 42 | 176 | 48 | 284 | — |
| | Measured value (70° C.) | 1387 | 1506 | 864 | 1445 | 1211 |
| | Improvement rate (70° C.) | 14 | 24 | −27 | 19 | — |

In Comparative example 1 which uses the liquid agent 13 of the reactive layer, and an acid anhydride as the component (C'), the improvement rate of adhering strength is lowered to the minus side in a press-bonding under an atmosphere of 70° C. In Comparative example 2 which uses the liquid agent 7 of the reactive layer, the component (C) exceeds 45% by mass with respect to the total liquid agent, and the squeeze-out characteristic is "x". In Examples 1 to 12 which use the liquid agents of reactive layers 1 to 6 (amine compound as a component (C)), 8 to 12 (amine compound as a component (C)), and 14 (phenol compound as a component (C)), the improvement rate of adhering strength is increased to the plus side as compared to the case of Comparative example 3 with only substrate layer without using a reactive layer. This shows that an amine compound and/or a phenol compound can be used in a reactive layer at a specific concentration.

Examples 13 to 16 and Comparative examples 4 to 10 that use the substrate layers 1 to 3 were checked for the squeeze-out characteristic and measured for the peeling/adhering strength. The results are shown in Table 5.

[Measurement of Peeling/Adhering Strength]

The substrate layers formed on the AL-PET surfaces and the reactive layers formed on the stainless plate surfaces were bonded to each other throughout an adhesion area of 25 mm×80 mm, and then bonded to each other by a press machine at a pressure of 0.2 MPa, under an atmosphere of heating of 70° C., taking 30 seconds. Then, after left standing under an atmosphere of 25° C. for 24 hours, the layers were peeled off from each other by a drawing test apparatus at a rate of 300 mm/minute in 180° direction. A maximum strength is set as a "measured value of adhering strength (N/m)", and a change in the measured values from Comparative examples 3, 6, and 8 using the same substrate layer without using a reactive layer is set as an "improvement rate of adhering strength (%)". As for Comparative examples 3, 6, and 8, a stainless plate without a reactive layer was bonded to the substrate layer formed on the AL-PET surface. Therefore, the "improvement rate of adhering strength" of Comparative examples 3, 6, and 8 is shown as "~". In the present invention, the improvement rate of adhering strength due to the reactive layer is preferably 5% or more, more preferably 10% or more, particularly preferably 20% or more.

TABLE 5

| Test item | | Example 13 | Example 14 | Example 15 | Example 16 |
|---|---|---|---|---|---|
| Squeeze-out property | | ○ | ○ | ○ | ○ |
| Adhering strength | Measured value (70° C.) | 1617 | 1846 | 1086 | 1291 |
| | Improvement rate (70° C.) | 34 | 52 | 39 | 65 |

| Test item | | Comparative example 3 | Comparative example 4 | Comparative example 5 | Comparative example 6 |
|---|---|---|---|---|---|
| Squeeze-out property | | — | ○ | ○ | — |
| Adhering strength | Measured value (70° C.) | 1211 | 1145 | 703 | 782 |
| | Improvement rate (70° C.) | — | −5 | −10 | — |

| Test item | | Comparative example 7 | Comparative example 8 | Comparative example 9 | Comparative example 10 |
|---|---|---|---|---|---|
| Squeeze-out property | | ○ | — | ○ | ○ |
| Adhering strength | Measured value (70° C.) | 1315 | 1293 | 1287 | 726 |
| | Improvement rate (70° C.) | 2 | — | 0 | −44 |

Examples 13 and 14 that use the raw liquid 1 as the substrate layer are compared with Comparative examples 3 and 4. Comparative example 4 that use the liquid agent 17 as the reactive layer includes an acid anhydride as the component (C') and the component (E), and exhibits an improvement rate of adhering strength changed to the minus side; while Examples 13 and 14 that include the component (C) and the component (B) exhibit an improvement rate of adhering strength raised to the plus side. Similarly, Examples 15 and 16 that use the raw liquid 2 as the substrate layer are compared with Comparative examples 5 and 6. Comparative example 5 that use the liquid agent 17 as the reactive layer exhibits an improvement rate of adhering strength changed to the minus side; while it has been changed to the plus side in Examples 15 and 16. A substrate layer in which the raw liquid 3 including a rubber elastomer other than the component (A) of the present invention is used has had no change or had a change to the minus side, as in Comparative examples 9 and 10. These show that use of a urethane elastomer is suitable to the substrate layer.

Examples 13 and 14 and Examples 15 and 16 show that combined use of the component (C) and the component (E) further improves the measured value of the adhering strength.

INDUSTRIAL APPLICABILITY

In recent years, electric and electronic machinery tools which include aplastic as an adherend have increased in number, and temperature as a condition for press-bonding of sheet adhesives is being lowered. When a temperature as a condition for heat press-bonding is lowered, an adhering strength tends to be lowered. However, the present invention realizes a high peeling/adhering strength even in a press-bonding in a low temperature of 20 to 90° C. The present invention has applicability to various electric and electronic machinery tools.

What is claimed is:

1. A sheet adhesive comprising a substrate layer and a reactive layer, wherein
    the substrate layer comprises a component (A) and a component (B) below, and
    the reactive layer is formed with a liquid agent comprising a component (C) below in an amount of from 0.01% by mass to 45% by mass, where said component (C) of said reactive layer is able to react with said component (B),
    component (A): a urethane elastomer,
    component (B): an epoxy resin,
    component (C): an amine compound and/or phenol compound.

2. The sheet adhesive according to claim 1, wherein the epoxy resin is a solid at 25° C.

3. The sheet adhesive according to claim 1, wherein the substrate layer is a substrate layer formed with the component (A) and the component (B) in a state compatibilized with each other.

4. The sheet adhesive according to claim 1, wherein the liquid agent further comprises a coupling agent as a component (E).

5. A thermal curing-type sheet adhesive which comprises the sheet adhesive according to claim 1.

6. A normal temperature curing-type sheet adhesive which comprises the sheet adhesive according to claim 1.

7. The sheet adhesive according to claim 1, where said liquid agent for forming said reactive layer further comprises a solvent (D).

8. The sheet adhesive according to claim 1, wherein said substrate layer is supported by a first adherend, and said reactive layer is supported by a second adherend.

* * * * *